United States Patent
Lumbis et al.

(10) Patent No.: US 6,950,732 B2
(45) Date of Patent: Sep. 27, 2005

(54) CAR CONTROL DEVICE ELECTRONICS

(75) Inventors: Anthony W. Lumbis, Watertown, NY (US); Dale R. Stevens, Adams Center, NY (US); John N. Versic, Watertown, NY (US)

(73) Assignee: New York Air Brake Corproation, Watertown, NY (US)

( * ) Notice: Subject to any disclaimer, the term of this patent is extended or adjusted under 35 U.S.C. 154(b) by 297 days.

(21) Appl. No.: 10/344,530

(22) PCT Filed: Aug. 3, 2001

(86) PCT No.: PCT/US01/41551

§ 371 (c)(1),
(2), (4) Date: Feb. 11, 2003

(87) PCT Pub. No.: WO02/23461

PCT Pub. Date: Mar. 21, 2002

(65) Prior Publication Data

US 2005/0085960 A1 Apr. 21, 2005

Related U.S. Application Data

(60) Provisional application No. 60/232,843, filed on Sep. 15, 2000.

(51) Int. Cl.⁷ .............................. G06F 19/00; G05D 1/00
(52) U.S. Cl. .......................... 701/20; 320/104; 303/128
(58) Field of Search ............................. 701/19, 20, 22, 701/70, 99; 320/104, 116, 118, 122; 180/7.1, 65.2, 65.4, 242; 290/40 R; 303/128, 127; 318/109, 434

(56) References Cited

U.S. PATENT DOCUMENTS

| | | | | |
|---|---|---|---|---|
| 5,917,249 A | * | 6/1999 | Kon et al. | 307/10.1 |
| 6,189,980 B1 | * | 2/2001 | Kull | 303/7 |
| 6,229,452 B1 | * | 5/2001 | Kull | 340/3.51 |
| 6,275,165 B1 | * | 8/2001 | Bezos | 340/3.44 |
| 6,294,845 B1 | * | 9/2001 | Yoshida et al. | 307/10.6 |
| 2001/0016918 A1 | * | 8/2001 | Alexander et al. | 713/323 |
| 2003/0183729 A1 | * | 10/2003 | Root et al. | 246/167 R |

* cited by examiner

Primary Examiner—Thomas G. Black
Assistant Examiner—Ronnie Mancho
(74) Attorney, Agent, or Firm—Barnes & Thornburg LLP; Perry Palan

(57) ABSTRACT

An electronic control system (20) for an electropneumatic brake for a rail vehicle having a power trainline (18), comprising a battery (34); a functional control module (30) and a power management module; wherein the functional control module (30) includes a brake controller for the electropneumatic brake, an interface to the power trainline, a transceiver for receiving brake signals, a power supply circuit deriving a power supply from the power trainline (18), and a control management controller for the transceiver and the power supply circuit; and wherein the power management module includes a battery charging circuit connected to the power supply and a power controller for the battery charging circuit and the power supply circuit.

39 Claims, 7 Drawing Sheets

US 6,950,732 B2

CAR CONTROL DEVICE ELECTRONICS

This application claims the benefit of Provisional application Ser. No. 60/232,843, filed Sep. 15, 2000.

BACKGROUND AND SUMMARY OF THE INVENTION

The present invention relates to electropneumatic brake control on a train and more specifically to the electronic portion of the car electropneumatic brake control.

Electropneumatic brake control valves are well known in the passenger railroad art and the mass transit railroad art. Because the trains are short and are not involved generally in a mix and match at an interchange of different equipment, the ability to provide pneumatic and electrical control throughout the train has been readily available in the passenger and the mass transit systems. In freight trains, the trains may involve as much as 100 cars stretching over one mile or more. The individual cars may lay idle in harsh environments for up to a year without use. Also, because of the long distance they travel, the cars are continuously moved from one consist to another as it travels to its destination. Thus, the use of electropneumatic-pneumatic valves in the freight trains has been very limited.

A prior art system with electropneumatic train brake controls is illustrated in FIG. 1. An operator control stand 10 generally has a pair of handles to control the train braking. It controls a brake pipe controller 12 which controls the brake pipe 14 running throughout the train. It also includes a trainline controller 16 with power source 17 which controls the trainline 18 which is a power line as well as an electrical communication line. The operator control stand 10, the brake pipe controller 12 and the trainline controller 16 are located in the locomotive.

Each car includes a car control device 20 having a car ID module 22 and a sensor 24 connected to the trainline 18. The pneumatic portion of the car brakes include a brake cylinder 26, a reservoir 28 and a vent valve 29. The car control device 20 is also connected to the brake pipe 14 and the trainline 18. The brake pipe controller 12 is available from New York Air Brake Corporation as CCBII® and described in U.S. Pat. No. 6,098,006 to Sherwood et al. The trainline controller 16 and the CCD 20 are also available from New York Air Brake as a product known as EP60®. The car control device is described in U.S. Pat. No. 5,967,620 to Truglio et al. and U.S. Pat. No. 6,049,296 to Lumbis, et al. Each of these patents and products are incorporated herein as necessary for the understanding of the present patent.

DETAILED DESCRIPTION OF THE PREFERRED EMBODIMENTS

Figure 2:
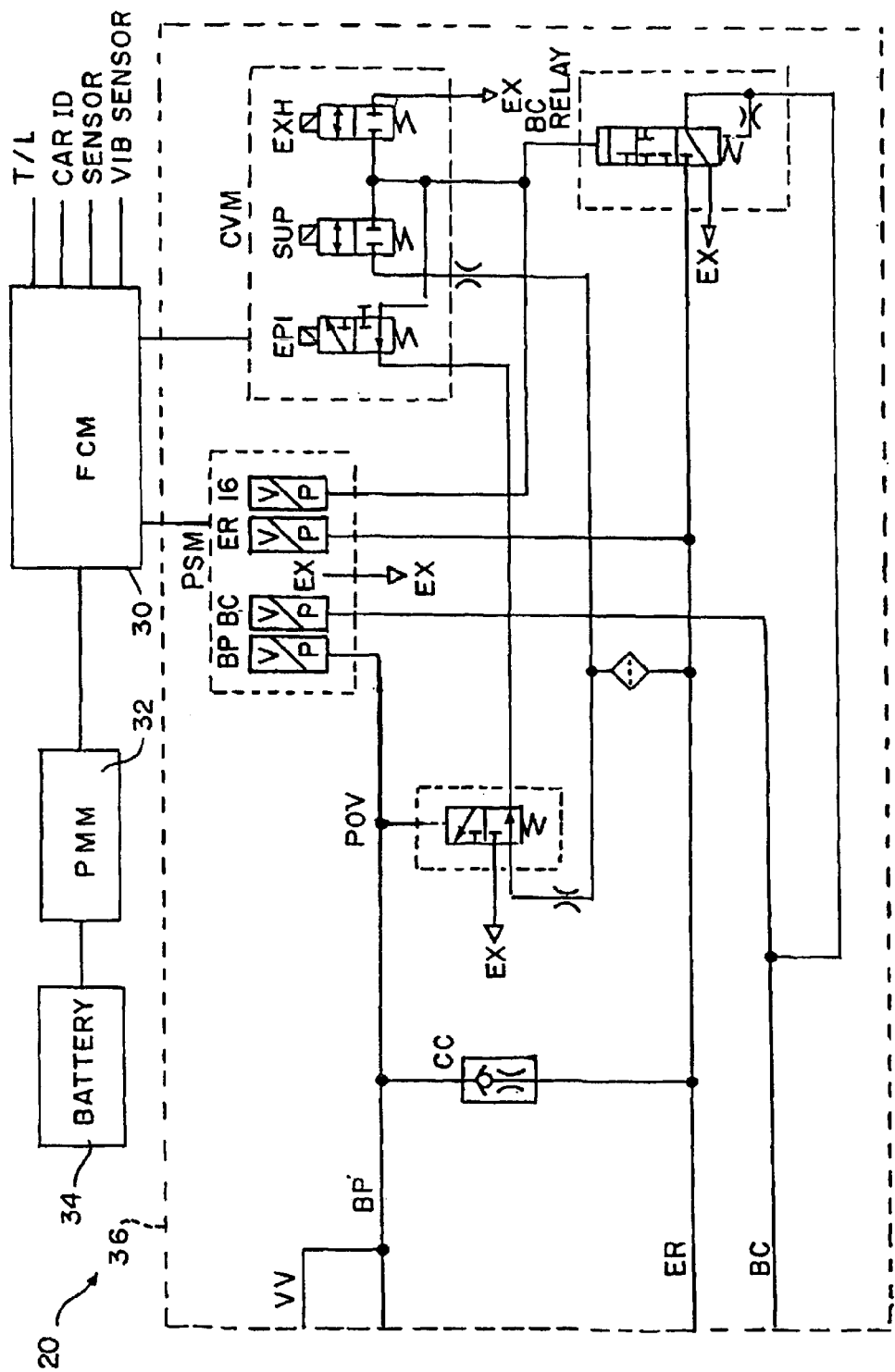
FIG. 2 is a block diagram of the car control device according to the principles of the present invention.

The car control device 20 is shown in detail in FIG. 2. It includes a functional control module 30 which is connected to the trainline T/L to receive power off the trainline 18 as well as to communicate to the trainline controller 16 over the trainline. It also provides power and communication to the car ID 22, the sensor 24 and a vibration sensor (not shown). Other auxiliary devices, for example, empty/load, hot wheel detector, may be connected to and powered by the CCD20. As described in the Lumbis U.S. Pat. No. 6,049,296, the car ID 22 and its sensor are used in an automatic train serialization. The car vibration sensor preferably is within the car control device 20 for added protection reduced wire length and improved accuracy of measurement.

The car control device 20 also includes a power management module 32 connected to the functional control module 30 to control the charging of battery 34. The battery is charged off the trainline T/L and used in combination with an off-line power source included in the functional control module 30 to provide the necessary power for the car control device 20. The functional control module 30 and power management module 32 are on individual circuit boards and one in a common housing with the battery.

The electropneumatic brake valve 36 is also connected to the functional control module 30 and is in the common housing. A pressure sensor module PSM, which includes pressure sensors for brake pipe BP, brake cylinder BC, a reservoir ER and the brake control #16, communicates with the functional control module 30. The functional control module 30 also provides control of the electropneumatic valves supply valve, exhaust valve and electropneumatic isolation valve EPI. The control brake cylinder relay BC RELAY, which provides signals to the brake cylinder port BC. It also includes a port VV for the vent valve 29 of FIG. 1. The details of the electropneumatic brake valve 36 are described in detail in the Truglio et al. U.S. Pat. No. 5,967,620.

Figure 1:
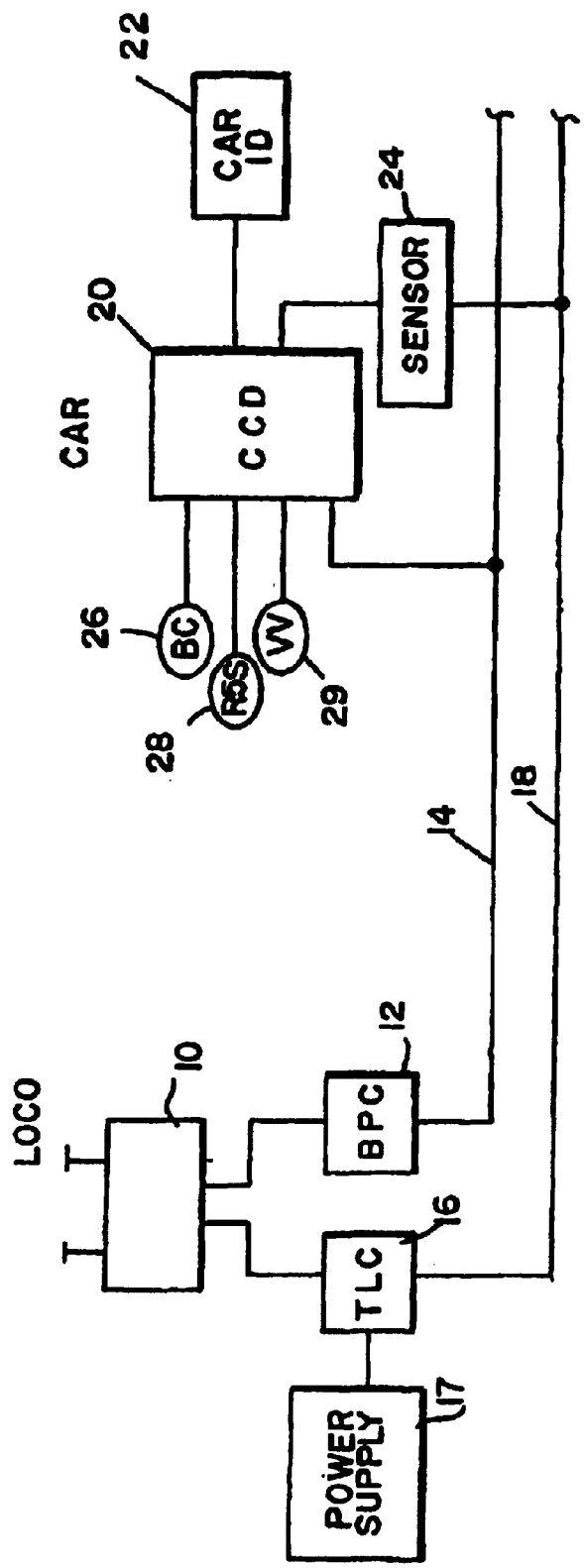
FIG. 1 is an electropneumatic brake control system of the prior art.

Although the illustrations in FIGS. 1 and 2 are for a stand alone system, which is only electropneumatic braking, it will also apply to an overlay system wherein the electropneumatic brake valve 36 may be used with a full pneumatic brake control valve, for example, a DB60 available from New York Air Brake. Such illustrations are shown in the Truglio et al. U.S. Pat. No. 5,967,620.

While the functional control module 30 includes a transceiver for communication on a network over the trainline 18, it also includes a neuron network to interconnect with various neuron nodes within the functional control module 30 and to communicate with the power management module 32, also in the neuron network. The network of choice by the industry is Lonworks.

Figure 3:
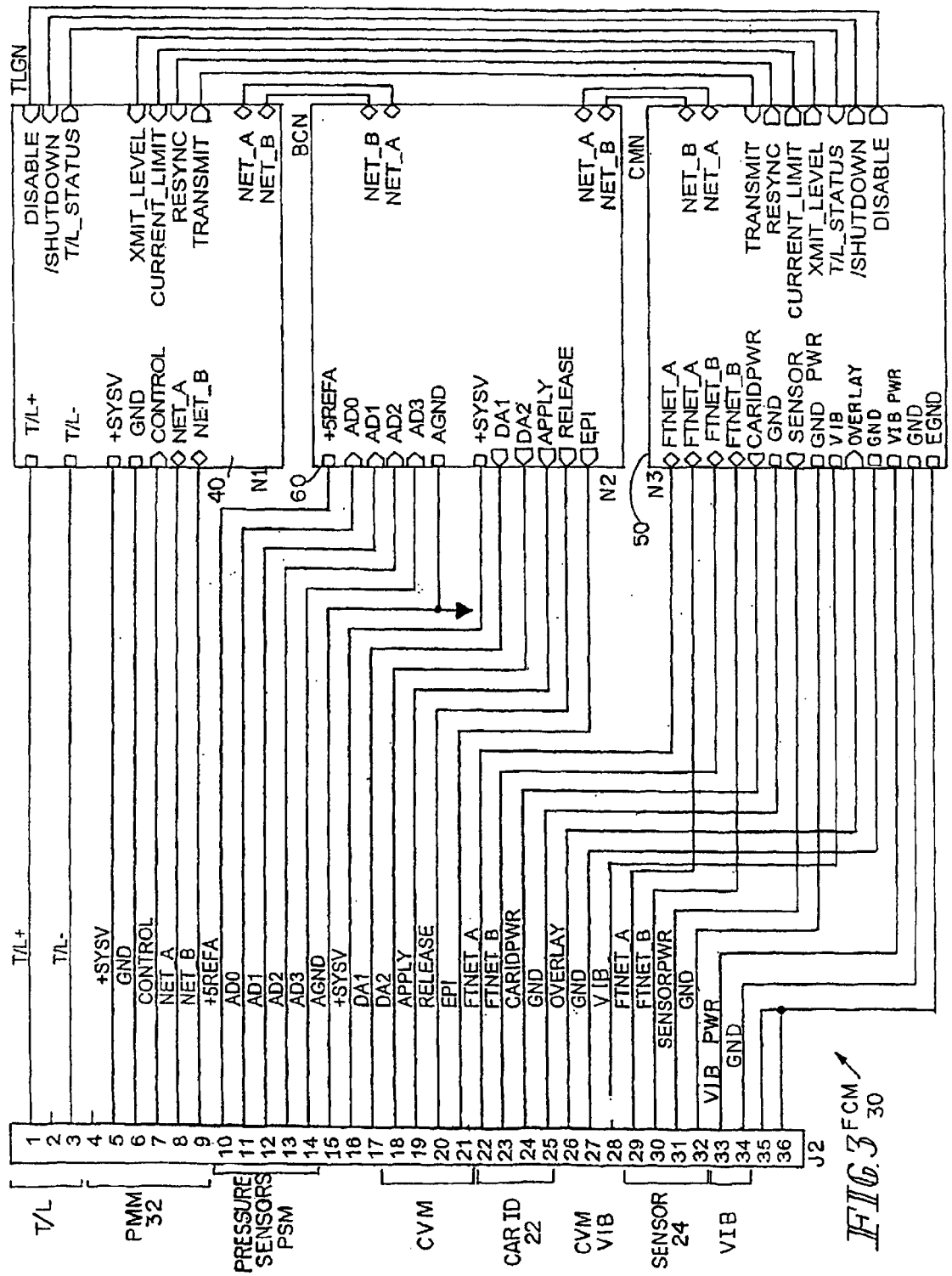
FIG. 3 is a block diagram of the functional control module of the car control device of the present invention.

The functional control module FCM 30, illustrated in detail in FIG. 3, includes three sections, namely a trainline gateway module TLGM 40, a brake control module BCM 60 and a control management module CMM 50. The trainline gateway module TLGM provides an interface between the trainline T/L and power management module 32 and the functional control module 30. Inputs/outputs T/L+ and T/L− are to the trainline 18. The interface with the power management module 32 includes a system voltage +SYSV, ground GND and network ports NETA and NETB. NETA and NETB are the network communications of the network between the modules and the nodes. As will be explained below, the control signal is the pulse width modulating signal PWM received from the power management module 32 to control the system off-line power source in the trainline gateway module 40.

Within the functional control module 30, the trainline gateway module 40, the brake control module 60 and the control management module 50 are interconnected in a network by NETA and NETB.

The trainline gateway module 40 includes a power supply circuit, a trainline transceiver and the trainline gate circuit. The power supply circuit produces a power supply driven off the trainline. It provides a trainline status signal T/L STATUS to the control management module CMM. The control management module 50 also provides a DISABLE and a SHUT DOWN signal to the trainline gateway module TLGM. The SHUT DOWN signal activates a switch to shut down the connection to the trainline and offer high impedance. The DISABLE signal disables the transceiver in the trainline gateway module 40. A resynchronization signal RESYNC received from the CMM restarts and resynchronizes the trainline transceiver.

A transmission level signal XMIT LEVEL from the CMM is provided to a sensor circuit in the TLGM which determines whether the transceiver is transmitting or not. A current limit signal CURRENT LIMIT is also provided from the CMM to the TLGM where it is used in a current limiting circuit to determine whether the current is too high and thereby modify the system power supply in combination with the CONTROL signal PWM from the power management module 32. The trainline gateway module TLGM will be described in detail with respect to FIG. 4.

The brake control module BCM 60 has four analog inputs AD0, AD1, AD2 and AD3 from the pressure sensor module PSM of FIG. 2 as well as a power terminal plus +5 REFA and ground AGND. The brake control module BCM also includes output signals, APPLY, RELEASE and EPI to control the solenoid valves in the control valve module CVM of FIG. 2. The brake control module BCM will be discussed in detail with respect to FIG. 6.

The control management module CMM 50 includes a transceiver to communicate with a car ID module 22 and the sensor 24 at ports FTNETA and FTNETB. It also provides power to the car ID 22 at terminals CAR ID PWR, to the 24 at terminal SENSOR PWR as well as the ground signals GND. CMM 50 would send commands to the car ID module 22 to collect the ID to be reported, command applying a load during serialization to collect detected current in the trainline during serialization and to collect the current detection in the load during serialization. The control management module CMM also provides power to the vibration sensor at terminal UIB PWR and GND and receives a signal from the vibration sensor at terminal VIB. If the vibration sensor is a node, the signals can be received on FTNETA, FTNETB.

The control management module CMM also receives a signal OVERLAY on its overlay terminal which indicates whether the car control device is operating at stand alone or overlay mode. This signal OVERLAY may be produced by a switch or a jump wire connected to the OVERLAY terminal and the adjacent GND terminal in the CVM. Other auxiliary inputs and power outputs may be provided to the car control device 20 through the functional control module 30. These could include an empty/load device, hot wheel detector, etc.

As discussed with respect to the trainline gateway module TLGM, the car management module CMM receives a TRANSMIT signal from TLGM and the trainline status TL STATUS signal from TLGM. It provides to TLGM the current limiting signal CURRENT LIMIT, the transmit level signal TXMIT level, a shut down signal SHUT DOWN and the disable signal DISABLE. The CMM uses the TRANSMIT signal to determine whether the trainline transceiver in the TLGM is stuck-on in a transmitting mode. If the trainline transceiver is stuck in transmission, CMM sends out a DISABLE signal to the TLGM. The CMM also uses the trainline status signal T/L STATUS, which is a digital value. The CMM sends a shut down signal SHUT DOWN to the TLGM to shut down the connection to the trainline of the off-trainline power supply. This prevents the power supply from interfering with the trainline during serialization using voltages below the normal operating range. Sequencing is usually conducted in the 20–30 VDC range. A more detailed explanation of the control management module CMM will be discussed in FIG. 5.

Figure 4:
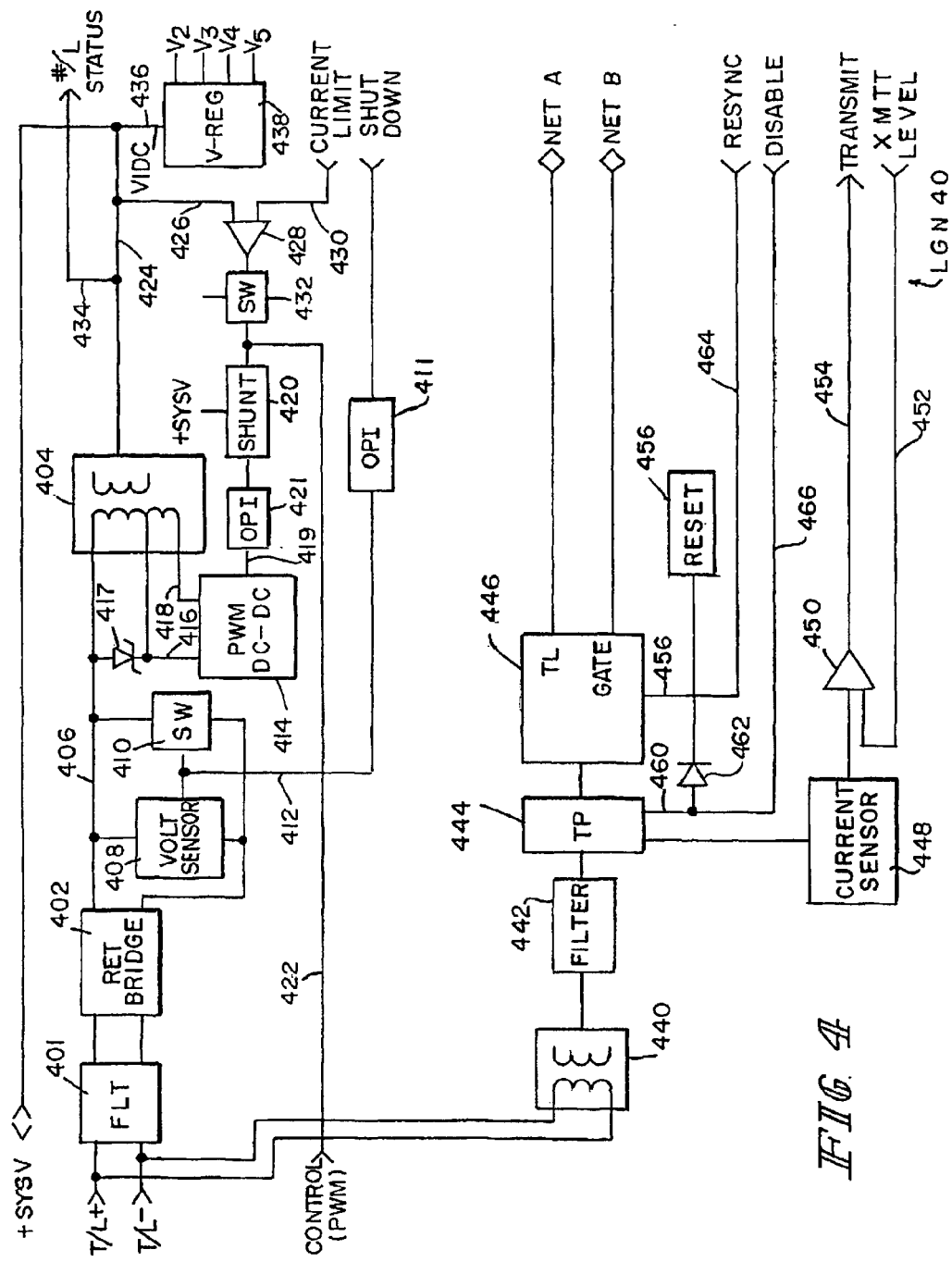
FIG. 4 is a block diagram of the trainline gateway module of the functional control module according to the principles of the present invention.

The trainline gateway module 40 is illustrated in detail in FIG. 4. The trainline terminals T/L are connected to a rectifying bridge 402. Fuses and varistors (not shown) provide input protection and filter 401 provides AC isolation from the DC trainline T/L. The bridge 402 is connected to a transformer 404 by a high voltage DC bus 406. Connected to the bus 406 is a voltage sensor 408. The voltage sensors 408 controls the switch 410, which when off, disconnects the return path for the primary of transformer 404 and an off-line power supply 414 connected to high power line 406 by line 416. When the voltage sensor 408 senses that the trainline voltage T/L has risen to a predetermined voltage range, it turns switch 410 on providing the return path. In that the operating voltage is a minimum of 100 volts, this voltage may be in the range of 50–80, for example. A shut down signal SHUT DOWN from the control management module CMM 50, via optical isolator 411 and line 412, controls the switch 410 to shut the power supply 414 down and disconnect the transformer 404.

The power supply 414, connected across the primary of the transformer 404, is shown as DC to DC converter 414. It is basically a current mode pulsed width modulated controller with an internal MOSFET. The DC to DC converter 414 may be, for example, a TOP, 224G top switch. A feedback from transformer 404 on line 418 provides a bias voltage for the DC to DC converter 414. The switch's duty cycle is regulated by a current which is fed into the control pin 419 so as to maintain a regulated voltage on the output 416. A feedback network, including a programmable shunt 420, is connected to and provides drive current into the control pin 419 via optical isolator 421. The output of the secondary of transformer 404 provides a signal feedback over line 426 to comparator 428.

The CURRENT LIMIT signal from the control management module 50 provided on input 430 to the comparator 428 with the signal 426. The result of this comparison is provided to switch 432. If the current on 426 at the output of the transformer 404 is greater than the CURRENT LIMIT provided on 430, switch 432 is activated as an input to programmable shunt 420. Also provided as an input to programmable shunt 420 is CONTROL or pulse width modulated signal PWM from the power management module 32 on-line 422. These two signals control the shunt 420 which determines the current that drives pin 419 of the DC to DC converter 414.

The supply voltage to the CCD electronics is derived from two sources, namely the off-line DC to DC converter 414 and the battery 34. The two sources are diode ORed together to provide the system power signal +SYSV. This +SYSV signal on line 424 is provided via line 436 to a voltage regulator 438. The various voltages are then tapped from line 436 and the output of regulation 438.

The shunt 420 is set, for example, at approximately 2.5 volts DC. When the system voltage +SYSV falls below the reference voltage, shunt 420 acts to decrease the sunk current at input 419 to the DC to DC converter 414. The duty cycle of PWM DC to DC converter 414 is inversely proportional to the control current. Thus, this drop at terminal 419 causes the cycle to increase which increases the output voltage of the transformer 404. As this output voltage increases, the system voltage +SYSV increases. In response thereto, the shunt 420 sends more current, thereby increasing the input at 419 of the PWM DC to DC converter 414 thereby decreasing its duty cycle and the output of transformer 404. In this manner, the programmable shunt 420 regulates the output voltage of the DC to DC converter 414 and +SYSV.

Also connected to the trainline T/L+ and T/L− is a transceiver 444 via transformer 440 and filter 442. Transceiver 444, for example, may be a PLT-10A. The transceiver 444 is connected to the internal network NETA and NETB by a trainline gateway node 446. This may be a neuron. A current sensor 448, for example, a current mirror, senses the current drawn by the transceiver 414 and provides it as a voltage input to a comparator 450. The other input to comparator 450 is the transmit level TXMIT LEVEL received from the car management module CMM50. The transceiver 444 uses more current in the transmission mode than in the receiving mode. The transmit level signal TXMIT LEVEL on 452 is greater than the receiving mode current and less than the transmitting node current. Thus, the output of converter 450 determines that the transceiver 454 is in the transmitting mode. The TRANSMIT signal is provided back to the CMM 50 to be used in a stuck on transmitter detector.

Reset circuit 456 generates a reset signal during power up to reset terminals 458 for the trainline gateway node 446 and 460 of the transceiver 444. The reset terminals are interconnected by a diode 462. Also connected to these reset terminals is the RESYNC signal at line 464 received from the CMM 50. The reset signal 456 or the resynchronization signal RESYNC are simultaneously applied to both the reset terminals 458 and 460. The DISABLE signal on line 466 from the CMM 50 is provided to the reset terminal 460 of the transceiver 444. This disables the transceiver 44 without resetting the trainline gateway node 446. The diode 462 prevents this from occurring. The DISABLE signal retains the transceiver 444 at its reset state which stops the transceiver 444 from transmitting.

Figure 5:
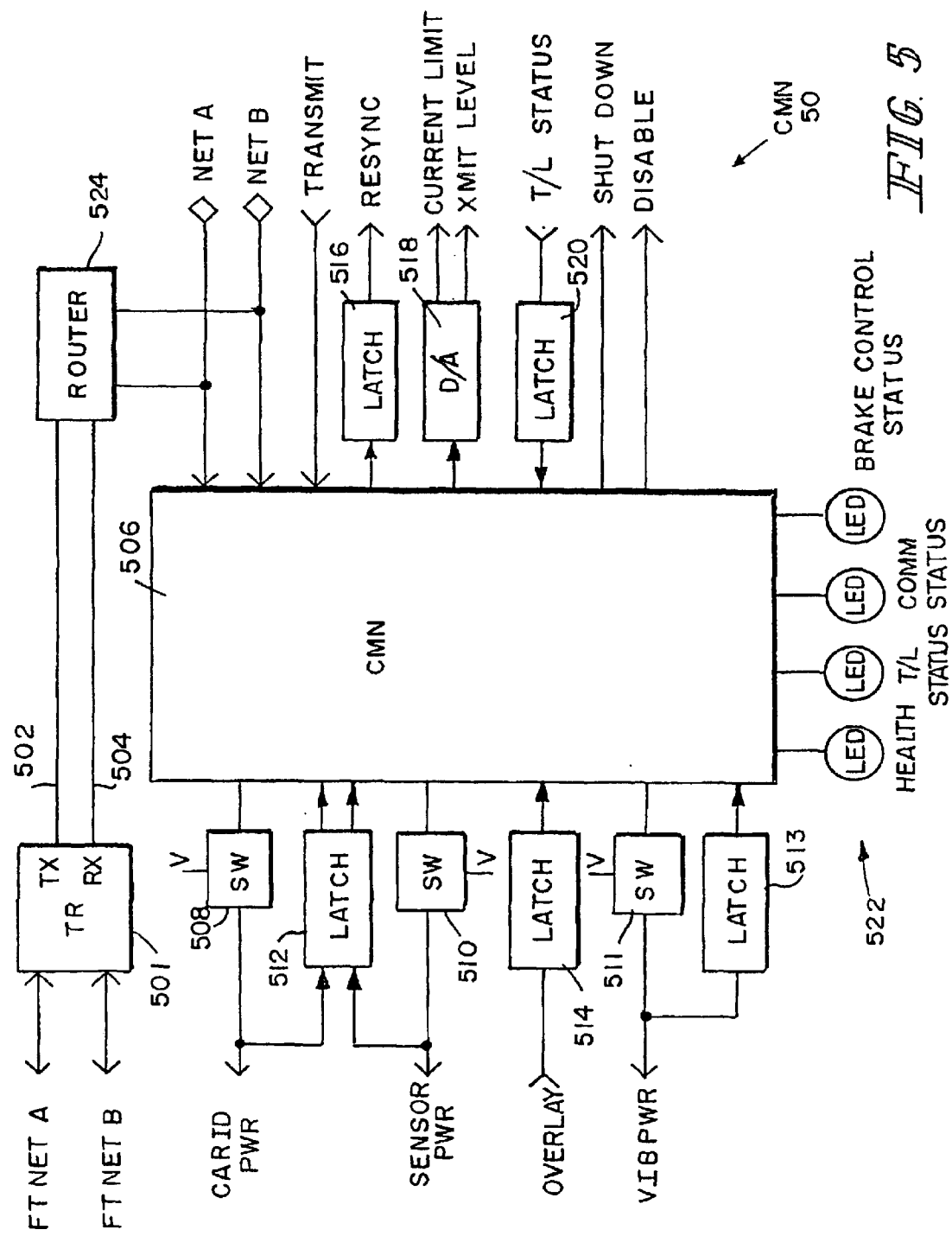
FIG. 5 is a block diagram of the control management module of the functional control module according to the principles of the present invention.

As shown in FIG. 5, the car management module node 50 includes a transceiver 501 transmitting signals between the neuron on the car ID circuit and the trainline sensor circuit and the control management node 506 via router 524. The transceiver may be, for example, an FTT-10 transmitting over twisted pairs. A switch 508, a switch 510 and a switch 511 connect the output of the car module controller 506 to the car ID power, the line sensor and vibration sensor modules. Latches 512 and 513 monitor the output of the switches and feeds it back to the control management node 506. The car ID and vibration sensor modules provide signals to the control management node 506 via FTNETA, B. A latch 514 also holds the OVERLAY input from the control valve module CVM at the input of the control management node 506.

The control management node 506 receives the TRANSMIT signal signifying the transmitting mode of the trainline transceiver 444 from TLGM 40. It measures the amount of time that the transmit signal is present and if it exceeds a predetermined time, it considers this a stuck on transmitter. This time, for example, may be a ½ of a second. The CMN 506 will then transmit a DISABLE signal to the TLGM 40 to disable the transceiver 444. If the CMN decides to reinitialize and resynchronize the transceiver 444 and the TL gateway node 446, it transmits a RESYNC output to the TLGM 40. A latch 516 maintains the RESYNC signal high until reset.

A digital to analog converter 518 takes the digital outputs of the CMN 506 and provides analog signals CURRENT LIMIT and XMIT LEVEL to the TLGM 40. A latch 520 also latches the value of the trainline T/L STATUS received from TLGM 40. The CMN 506 may also provide a SHUT DOWN signal to TLGM 40 to shut down the DC to DC converter 414.

Four indicators or light emitting diodes LEDS 522 are controlled by the CMN 506. They indicate health, T/L status, comm status and brake control status. A router 512 is also provided on the NETA and NETB terminals of the CMN 506.

The CMN 506 via transceiver 501 may receive signals from the trainline controller 116 to limit the amount of watts drawn from the trainline 18. This value can be used to set the current limit which is an input to the control circuit for the DC to DC converter 414. Also, upon receipt of a signal from the trainline, it may issue the SHUT DOWN signal. Battery charging may also be performed using the method described in U.S. Pat. No. 5,647,562 to Lumbis, et al.

Figure 6:
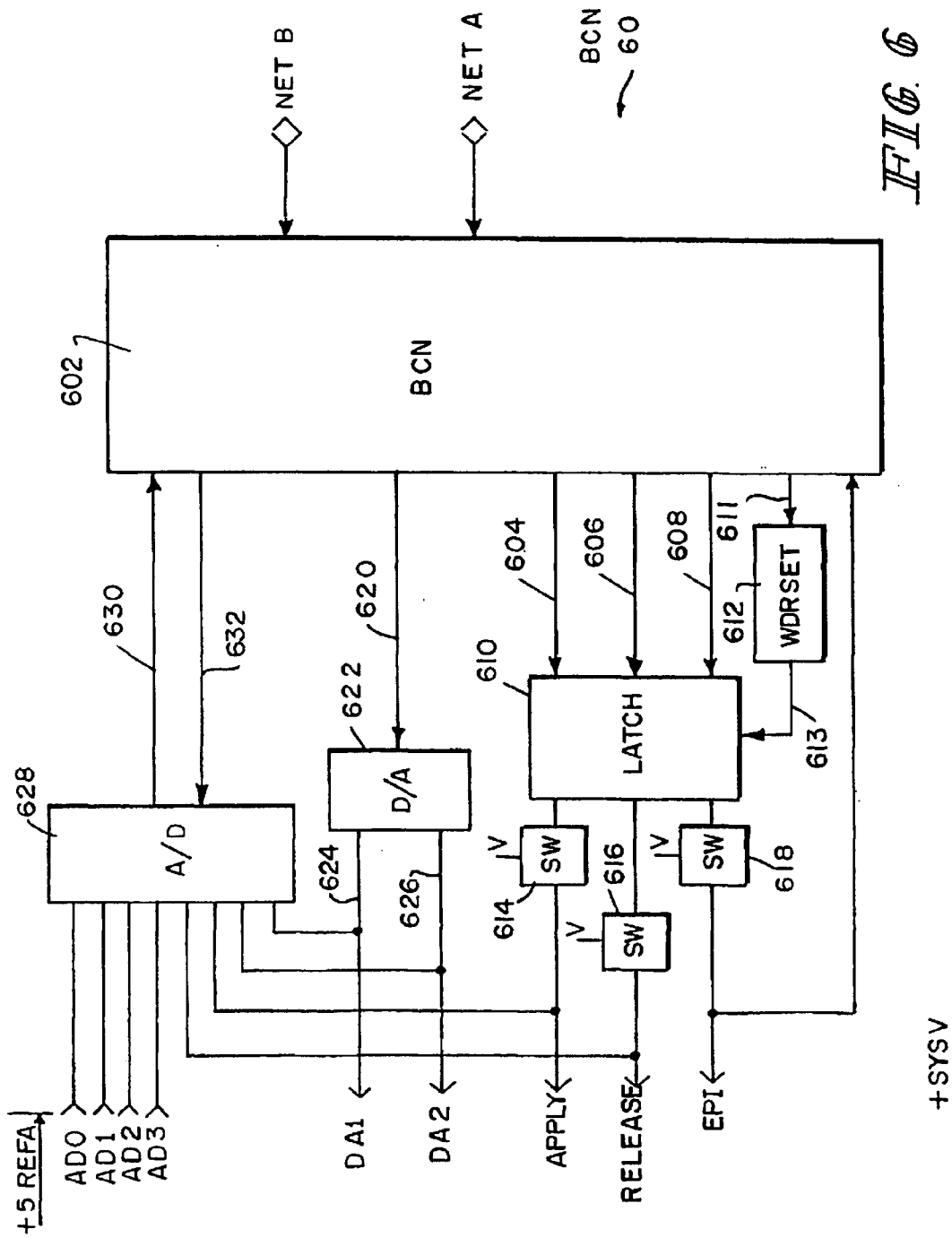
FIG. 6 is a block diagram of the brake control module of the functional control module according to the principles of the present invention.

The brake control module 60 is illustrated in FIG. 6. A brake control node 602, which is shown as a neuron, is connected by NETA and NETB to the trainline gateway module 40 and the control management module 50. The digital control signals for the APPLY, RELEASE and EPI valves of the EP brake valve 36 are provided on lines 604, 606 and 608 respectfully to latch 610. The latch 610 is reset by a watchdog circuit reset 612 via line 613. The watchdog circuit 612 responds to the absence of a strobe signal on line 611 from brake control node 602. The output of the latch 610 drives switches 614, 616 and 618 to provide an analog signal to the apply, release and output lines respectfully.

Data signals from the BCN 602 on line 620 are converted by a digital to analog converter 622 to digital output signals DA1 and DA2 on line 624 and 626 respectfully. An A/D converter 628 receives feedback signals from the APPLY, RELEASE, DA1 and DA2 ports and provides them over line 630 as digital input signals to BCN 602. A/D converter 628 also receives the analog signals AD0, AD1, AD2 and AD3 from the four pressure sensors in the pressure sensing module PSM of the electropneumatic brake valve 36.

Figure 7:
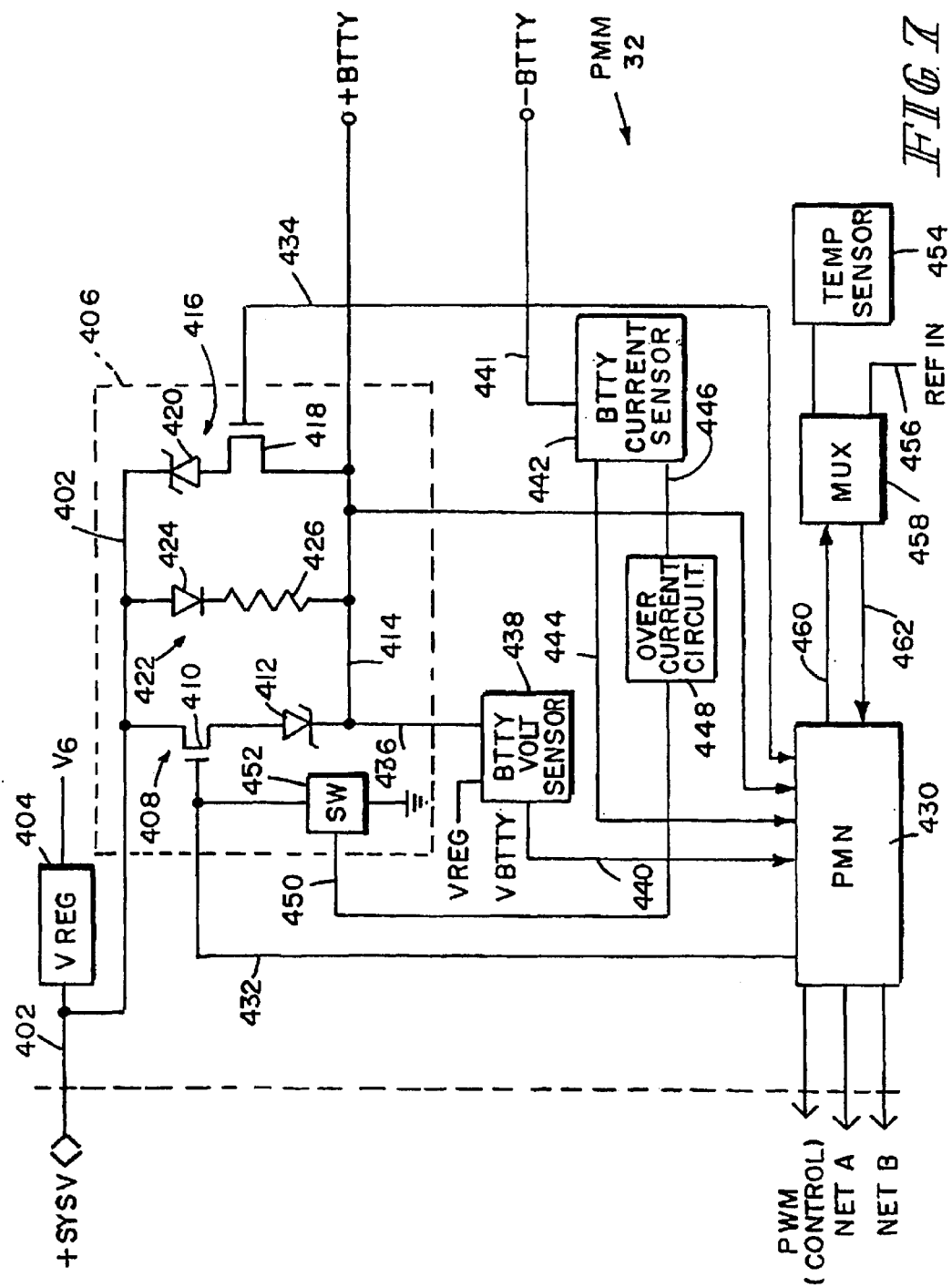
FIG. 7 is a block diagram of the power management module according to the principles of the present invention.

The power management module 32 is illustrated in detail in FIG. 7. The system power supply voltage +SYSV is provided at line 402 and is connected to voltage regulatory 404 that produces voltage B6. Line 402 is also connected to the charging/discharging circuit 406. A charging leg 408 connected to line 402 includes transistor 410 and zener diode 412. The discharge leg 416 includes transistor 418 and zener diode 420. The charge and discharges legs are in antiparallel arrangements. A slow charge leg 422 includes zener diode 424 and resistor 426. This allows slow charging when the charge and discharge legs are not active. They are all connected to line 414 which is the positive terminal of the battery +BTTY.

The power management node PMN 430 is a neuron and it provides a charge signal over line 432 to control transistor 410 and a discharge signal over line 434 to control discharge transistor 418. The positive side of the battery on line 414 is connected via line 436 to a battery voltage sensor 438. The battery voltage VBTTY is provided over line 440 to the PMN 430.

A battery current sensor 442 is connected to the negative terminal of the battery −BTTY via line 441. Battery current IBTTY is provided on line 440 to the PMN 430. The battery current is also provided over line 446 to over current circuit 448. If the battery current, for example, during charging, is above a preselected limit, then the over current circuit 448 produces an output on line 450 to control switch 452 to turn off transistor 410 of the charging leg 408. This will override any signal online 432 from the PMN 430.

A temperature sensor 454 is provided as one input to a multiplex 458. The second input is a reference input 456. The temperature sensor 454 may be a temperature to frequency device whose voltage output is proportional to the temperature. PMN 430 via line 460 determines the state of the multiplexer 450 to determine whether the output of the voltage sensor 454 or the reference in voltage on 456 is provided as an input via line 462 back to the PMN 430.

If the input from the temperature sensor 454 is selected, the PMN will then convert the frequency into a voltage. The PMN compares, based on the selected signal on line 462, the temperature sensor 454 or the reference input 456 with the information received from the battery voltage sensor 438 or the battery current sensor 442 to provide the control signal PWM as an input to the shunt 420 of the DC to DC converter 414 of TLGM 440. This controls the power supply circuit portion of the system voltage +SYSV. By controlling +SYSV, the value of the battery charged by the charging circuit 406 is adjusted. This adjusts the charging current and ultimately, the final voltage of the battery.

PMN 430 also has the ability of monitoring the battery capacity. PMN 430 monitors the battery current received from battery current sensor 442 over periods of time and accumulates the current times time period over time. For example, if the battery current is measured every second, the value of the current which can be added directly and accumulated. Thus, the capacity accumulated would be, in for example, milliamps-seconds. Every 3600 seconds, the accumulated value can be converted to milliamps-hours. This value is stored in the PMN 430 and also can be reported out to the network for NETA and NETB.

PMN 30 assumes that at start up that the battery capacity and power up to zero. Once powered and the battery is connected to the system, the only way for the battery to be disconnected under control is for the battery terminal to drop below a lower limit. Once below this lower limit, which is above zero, the battery is assumed to be exhausted and will have a zero capacity. Should the battery be disconnected by a service technician and be replaced, it would also assume a zero capacity in the accumulator. Upon replacement, the PMN 430 will determine the actual battery capacity by monitoring the charging conditions as it advances through the charging modes and based on how the battery responds. The capacity will only be adjusted based on this determination.

Although the stuck-on transmission mode has been described with respect to the CCD 20, the same circuitry can be provided in the trainline controller 16. Also, other elements of the CCD 20 which are common to the trainline controller 16 may be provided therein.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A car control device electronic system for an electropneumatic brake for a rail vehicle having a power trainline, the system comprising:
   a functional control module and a power management module;
   a battery;
   the functional control module including a brake controller for the electropneumatic brake, an interface to the power trainline, a transceiver for receiving brake signals, a power supply circuit deriving a power supply from the power trainline, and a control management controller for the transceiver and the power supply circuit; and
   the power management module including a battery charging circuit connected to the power supply and a power controller for the battery charging circuit and the power supply circuit.

2. The system according to claim 1, wherein the brake controller, the control management controller and the power controller are nodes on a network.

3. The system according to claim 1, wherein the functional control module includes a stuck-on transmission sensor.

4. The system according to claim 1, wherein the transceiver draws a first current for transmitting and a second current for receiving, the circuit and the stuck-on transmission sensor includes:
   a current sensor sensing the current drawn by the transceiver;
   a comparator determining if the sensed current is between the first and second currents;
   a timer determining the amount of time the sensed current is between the first and second currents; and
   the control management controller identifying a stuck-on transmission if the amount of time the measured current is determined to be between the first and second currents is more than a preset amount of time.

5. The system according to claim 4, wherein the control management controller disables the transmitter when identified as stuck-on.

6. The system according to claim 5, the control management controller maintains a disable signal at a reset terminal of the transceiver to disable the transmitter; including a reset circuit connected to reset terminals of the transceiver and the control management controller; and wherein the control management controller subsequently removes the disable signal from the transceiver reset terminal and the reset circuit provides a reset signal to the reset terminals of the transceiver and the control management controller.

7. The system according to claim 1, wherein the power supply circuit controls the power supply to a set point as a function of a set point signal and the power controller provides the set point signal.

8. The system according to claim 7, including a temperature sensor on the power management module and the power controller produces the set point signal as a function of the sensed temperature.

9. The system according to claim 8, including a reference terminal on the power controller and the power controller produces the set point signal as a function of the sensed temperature or a signal on the reference terminal.

10. The system according to claim 7, wherein the power controller determines the set point signal for the power supply level to thereby control the battery charging circuit.

11. The system according to claim 1, wherein the power controller considers the battery inoperative for voltage below a predetermined voltage above zero volts and resets the charging circuit.

12. The system according to claim 1, wherein the charging circuit includes a charging path and discharging path and each path includes a switch controlled by the power controller.

13. The system according to claim 12, wherein the power management module includes battery current sensor and a comparator to turn off the switch in the charging path when the battery current exceeds a predetermined value.

14. The system according to claim 12, wherein the charging circuit includes a switchless slow charging path in parallel with the switch of the charging path.

15. The system according to claim 1, wherein the power management module includes a battery capacity monitor.

16. The system according to claim 15, wherein the battery capacity monitor senses charge and discharge current of the battery at fixed time intervals, accumulates the sensed current, and determines the capacity as the accumulated sensed current times the fixed time interval.

17. The system according to claim 1, wherein the trainline has an operating voltage and a serialization voltage and the control management node shuts down the power supply from the trainline for trainline voltages below the operating voltage.

18. The system according to claim 1, wherein the control management controller controls the amount of watts the power supply draws from the power trainline.

19. The system according to claim 1, including a vibration sensor connected to the functional control module.

20. The system according to claim 19, wherein the functional control module, power management module, battery and vibration sensor are in a common housing.

21. The system according to claim 1, wherein the functional control module and power management module are on individual circuit boards and mounted in a common housing with the battery.

22. A power management system for a car on train connected to a power trainline, the system comprising:
   a battery;
   a power supply circuit deriving a power supply from the power trainline;
   a battery charging circuit; and
   a controller determining a state of the battery and controlling the power supply circuit to maintain a programable state of the battery.

23. The system according to claim 22, wherein the controller determines the battery charging current and adjusts the power supply level to thereby control the charging current.

24. The system according to claim 22, wherein the controller determines the battery voltage and adjusts the power supply level to thereby control the battery charging and voltage.

25. The system according to claim 22, including a temperature sensor and the controller controls the battery charging as a function of the sensed temperature.

26. The system according to claim 22, including a temperature sensor and the controller controls the power supply level as a function of the sensed temperature.

27. The system according to claim 22, wherein the power supply circuit controls the power supply to a set point as a function of a set point signal and said controller provides the set point signal.

28. The system according to claim 27, including a temperature sensor and the controller produces the set point signal as a function of the sensed temperature.

29. The system according to claim 28, including a reference terminal and the controller produces the set point signal as a function of the sensed temperature or a signal on the reference terminal.

30. The system according to claim 22, wherein the controller controls the amount of watts the power supply draws from the power trainline.

31. The system according to claim 30, including a transceiver and the controller receives the amount of watts from the transceiver.

32. The system according to claim 22, wherein the controller considers the battery inoperative for voltage below a predetermined voltage above zero volts and resets the charging circuit.

33. The system according to claim 22, wherein the trainline has an operating voltage and a serialization voltage and the controller shuts down the power supply from the trainline for trainline voltages below the operating voltage.

34. A method of managing the capacity of a battery in a car of a train connected to a power trainline, the method comprising:
   sensing charge and discharge current of the battery at fixed time intervals;
   accumulating the sensed current; and
   determining the capacity as the accumulated sensed current times the fixed time interval.

35. The method according to claim 34, wherein the fixed time interval is one second and the accumulated value is amps-seconds.

36. The method according to claim 34, assume the battery capacity is zero initially; monitor the charging current to determine actual capacity and adjust the accumulated sensed current.

37. The method according to claim 34, including determining if sensed charging current exceeds a predetermined value and terminating charging if the value is exceeded.

38. The method according to claim 34, wherein the car also includes a system power supply derived from the power trainline; and including determining if sensed charging current exceeds a predetermined value and reducing the system power supply level to thereby reduce the charging current if the value is exceeded.

39. The method according to claim 34, including sensing the temperature and controlling the battery charging as a function of the sensed temperature.

* * * * *